United States Patent
Dai et al.

(10) Patent No.: US 11,586,315 B2
(45) Date of Patent: Feb. 21, 2023

(54) DISPLAY SUBSTRATE, DISPLAY DEVICE AND METHOD OF MANUFACTURING SAME

(71) Applicants: MIANYANG BOE OPTOELECTRONICS TECHNOLOGY CO., Ltd., Sichuan (CN); BOE Technology Group Co., Ltd., Beijing (CN)

(72) Inventors: Ming Dai, Beijing (CN); Dandan Jiang, Beijing (CN); Xuwei Li, Beijing (CN); Haoyuan Fan, Beijing (CN); Jenyu Lee, Beijing (CN)

(73) Assignees: MIANYANG BOE OPTOELECTRONICS TECHNOLOGY CO., LTD., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/568,400

(22) Filed: Jan. 4, 2022

(65) Prior Publication Data

US 2022/0300101 A1   Sep. 22, 2022

(30) Foreign Application Priority Data

Mar. 16, 2021   (CN) .......................... 202110282541.8

(51) Int. Cl.
*G06F 3/041*   (2006.01)
*G02B 1/14*   (2015.01)
(Continued)

(52) U.S. Cl.
CPC ........... *G06F 3/0412* (2013.01); *G02B 1/002* (2013.01); *G02B 1/04* (2013.01); *G02B 1/14* (2015.01);
(Continued)

(58) Field of Classification Search
CPC ................. G06F 3/0412; G06F 1/1686; G06F 2203/04103; G02B 1/14; G02B 1/002; G02B 1/04
See application file for complete search history.

(56) References Cited

U.S. PATENT DOCUMENTS

2016/0172633 A1* 6/2016 Ahn .................... H01L 27/3272
257/40
2020/0194469 A1* 6/2020 Hu ..................... G02F 1/136286
(Continued)

FOREIGN PATENT DOCUMENTS

CN   109659320 A   4/2019
CN   109950426 A   6/2019
(Continued)

OTHER PUBLICATIONS

CN202110282541.8 first office action.

*Primary Examiner* — Peter D McLoone
(74) *Attorney, Agent, or Firm* — IPro, PLLC

(57) ABSTRACT

A display substrate is provided. The display substrate includes a plurality of organic material film layers and a plurality of inorganic material film layers, wherein the plurality of organic material film layers and the plurality of inorganic material film layers are provided with a functional hole, and the functional hole is disposed in an aperture area of the display substrate. An organic material is provided on an inner side wall of the functional hole in at least one of the inorganic material film layers.

18 Claims, 7 Drawing Sheets

(51) Int. Cl.
  *G02B 1/00*  (2006.01)
  *G02B 1/04*  (2006.01)
  *G06F 1/16*  (2006.01)

(52) U.S. Cl.
  CPC .. *G06F 1/1686* (2013.01); *G06F 2203/04103* (2013.01)

(56) References Cited

U.S. PATENT DOCUMENTS

2020/0381660 A1* 12/2020 Lee .................... H01L 51/5253
2021/0167327 A1   6/2021 Cai et al.

FOREIGN PATENT DOCUMENTS

| CN | 111180609 A | 5/2020 |
| CN | 112164766 A | 1/2021 |
| CN | 112186023 A | 1/2021 |

\* cited by examiner

100

100

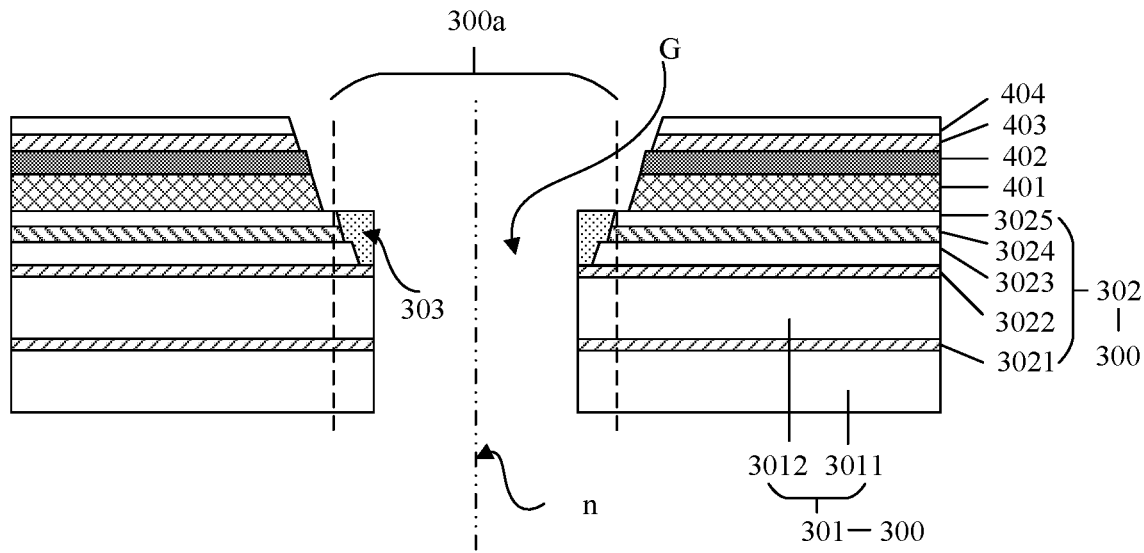

FIG. 7

| | |
|---|---|
| Forming a first organic material layer, a first inorganic material layer, a second organic material layer, a second inorganic material layer, a third inorganic material layer, a fourth inorganic material layer, and a fifth inorganic material layer in sequence | 501 |
| Removing portions, disposed in an aperture area, of the third inorganic material layer, the fourth inorganic material layer, and the fifth inorganic material layer to form a groove | 502 |
| Filling the groove with an organic material | 503 |
| Forming a first chemical vapor deposition film layer, a second chemical vapor deposition film layer, and a barrier layer and an insulating isolation layer of a touch panel in sequence | 504 |
| Patterning the barrier layer and the insulating isolation layer | 505 |
| Removing portions, disposed in the aperture area, of the first chemical vapor deposition film layer and the second chemical vapor deposition film layer | 506 |
| Forming a functional hole in the aperture area | 507 |

FIG. 8

DISPLAY SUBSTRATE, DISPLAY DEVICE AND METHOD OF MANUFACTURING SAME

CROSS-REFERENCE TO RELATED APPLICATION

This application is based on and claims priority to Chinese Patent Application No. 202110282541.8, filed on Mar. 16, 2021 and entitled "DISPLAY SUBSTRATE, DISPLAY DEVICE AND METHOD OF MANUFACTURING SAME", the disclosure of which is herein incorporated by reference in its entirety.

TECHNICAL FIELD

The present disclosure relates to the field of display technologies, and more particularly to a display substrate, a display device and a method of manufacturing the same.

BACKGROUND

As the demands of users on the screen-to-body ratio of cell phones become increasingly higher, screens with an on-screen aperture are favored by consumers. The cutting process on the position of aperture is particularly critical in the on-screen aperture technologies.

SUMMARY

The present disclosure provides a display substrate, a display device, and a method of manufacturing the same. The technical solutions are as follows.

In an aspect, a display substrate is provided. The display substrate includes: a plurality of organic material film layers and a plurality of inorganic material film layers, wherein the plurality of organic material film layers and the plurality of inorganic material film layers are provided with a functional hole, and the functional hole is disposed in an aperture area of the display substrate; wherein an inner side wall of the functional hole in at least one of the plurality of inorganic material film layers is provided with an organic material.

Optionally, the plurality of organic material film layers include a first organic material layer and a second organic material layer, and the plurality of inorganic material film layers include a first inorganic material layer, a second inorganic material layer, a third inorganic material layer, a fourth inorganic material layer and a fifth inorganic material layer; wherein the first organic material layer, the first inorganic material layer, the second organic material layer, the second inorganic material layer, the third inorganic material layer, the fourth inorganic material layer and the fifth inorganic material layer are sequentially laminated; and the inner side wall of the functional hole in at least one of the third inorganic material layer, the fourth inorganic material layer, and the fifth inorganic material layer is provided with the organic material.

Optionally, the organic material covers an end face, facing the functional hole, of at least one of the third inorganic material layer, the fourth inorganic material layer and the fifth inorganic material layer.

Optionally, the organic material covers the end face, facing the functional hole, each of the third inorganic material layer, the fourth inorganic material layer and the fifth inorganic material layer.

Optionally, the inner side wall of the functional hole in the first organic material layer, the first inorganic material layer, the second organic material layer and the second inorganic material layer is flush with the inner side wall, on which the organic material is provided, of the functional hole in the third inorganic material layer, the fourth inorganic material layer and the fifth inorganic material layer.

Optionally, an orthographic projection of the organic material onto the first organic material layer covers a target area of the first organic material layer; and
the target area is a portion, disposed in the aperture area, of the first organic material layer.

Optionally, the third inorganic material layer is a buffer layer, the fourth inorganic material layer is an insulating layer, and the fifth inorganic material layer is an interlayer dielectric layer.

Optionally, the organic material is polyimide.

Optionally, the plurality of organic material film layers further include a third organic material layer, and the third organic material layer is disposed in a pad bending area of the display substrate.

Optionally, the third organic material layer and the organic material are formed by a same patterning process.

Optionally, the third organic material layer and the organic material are made of a same material in a same layer.

Optionally, a sum of thicknesses of the first inorganic material layer and the second inorganic material layer is less than 5% of a sum of thicknesses of the first organic material layer, the first inorganic material layer, the second organic material layer, the second inorganic material layer, the third inorganic material layer, the fourth inorganic material layer, and the fifth inorganic material layer.

Optionally, the sum of the thicknesses of the first inorganic material layer and the second inorganic material layer is less than 1% of the sum of the thicknesses of the first organic material layer, the first inorganic material layer, the second organic material layer, the second inorganic material layer, the third inorganic material layer, the fourth inorganic material layer, and the fifth inorganic material layer.

Optionally, the thickness of the first organic material layer ranges from 5 μm to 10 μm, the thickness of the first inorganic material layer ranges from 2000 Å to 5000 Å, the thickness of the second inorganic material layer ranges from 2000 Å to 5000 Å, the thickness of the second organic material layer ranges from 5 μm to 10 μm, and a sum of thicknesses of the third inorganic material layer, the fourth inorganic material layer, and the fifth inorganic material layer ranges from 0.5 μm to 2 μm.

In another aspect, a display device is provided. The display device includes a display substrate and a power supply assembly, wherein the power supply assembly is configured to supply power to the display substrate; and the display substrate includes: a plurality of organic material film layers and a plurality of inorganic material film layers, wherein the plurality of organic material film layers and the plurality of inorganic material film layers are provided with a functional hole, and the functional hole is disposed in an aperture area of the display substrate; wherein an inner side wall of the functional hole in at least one of the plurality of inorganic material film layers is provided with an organic material.

Optionally, the display device further includes a touch panel, wherein the touch panel includes a barrier layer and an insulating isolation layer sequentially laminated along a direction going away from the display substrate.

Optionally, the display device further includes a first chemical vapor deposition film layer and a second chemical vapor deposition film layer disposed between the display substrate and the touch panel.

In still another aspect, a method of manufacturing a display device is provided. The method includes: forming a plurality of organic material film layers and a plurality of inorganic material film layers of a display substrate; forming a groove in at least one of the plurality of inorganic material film layers, wherein the groove is disposed in an aperture area of the display substrate; filling the groove with an organic material; forming a touch panel on a side of the display substrate; and forming a functional hole in the aperture area, wherein a cutting line of the functional hole is inside the organic material so that an inner side wall of the functional hole is provided with the organic material.

Optionally, the plurality of organic material film layers include a third organic material layer, and the third organic material layer is disposed in a bending area of the display substrate; and filling the groove with the organic material includes: forming the third organic material layer and the organic material filling the groove by a same patterning process.

Optionally, forming the plurality of organic material film layers and the plurality of inorganic material film layers of the display substrate includes: forming a first organic material layer, a first inorganic material layer, a second organic material layer, a second inorganic material layer, a third inorganic material layer, a fourth inorganic material layer, and a fifth inorganic material layer in sequence; and forming the groove in at least one of the plurality of inorganic material film layers includes: removing, portions, disposed in the aperture area, of the third inorganic material layer, the fourth inorganic material layer and the fifth inorganic material layer to form the groove; wherein after filling the groove with the organic material, a surface of the organic material distal from the first organic material layer is flush with a surface of the fifth inorganic material layer distal from the first organic material layer.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description are merely some embodiments of the present disclosure, and persons of ordinary skill in the art may still derive other drawings from these accompanying drawings without creative efforts.

FIG. 7 is a schematic structural diagram of a display device according to an embodiment of the present disclosure;

FIG. 8 is a flow chart showing a method of manufacturing a display device according to an embodiment of the present disclosure;

DETAILED DESCRIPTION

For clearer descriptions of the objectives, technical solutions, and principles of the present disclosure, the present disclosure is described in detail hereinafter in combination with specific embodiments and with reference to the accompanying drawings.

It should be noted that unless otherwise defined, technical or scientific terms used in the embodiments of the present disclosure shall have ordinary meaning understood by persons of ordinary skill in the art to which the disclosure belongs. The terms "first", "second" and the like used in the present disclosure are not intended to indicate any order, quantity or importance, but are merely used to distinguish the different components. The terms "comprise, comprises and comprising" or "include, includes and including" and the like are used to indicate that the element or object preceding the terms covers the element or object following the terms and its equivalents, and shall not be understood as excluding other elements or objects. The terms "connect to" or "connect with" and the like are not intended to be limited to physical or mechanical connections, but may include electrical connections, either direct or indirect connection. "Upper", "lower", "left", "right" and the like are merely intended to denote relative positional relationships, which may also be changed accordingly when the absolute position of the object described is changed.

In the manufacturing process of the display device, in general, inorganic film layers of a back plate and inorganic film layers formed in an evaporation vapor process or an encapsulation process are both laminated in the entire layer, such that a thick inorganic film layer is formed in an aperture area. As a result, a crack easily occurs when the aperture area is cut by laser to form an aperture, which causes poor products. For example, a growing dark spot (GDS) may be generated due to the crack.

Figure 1:
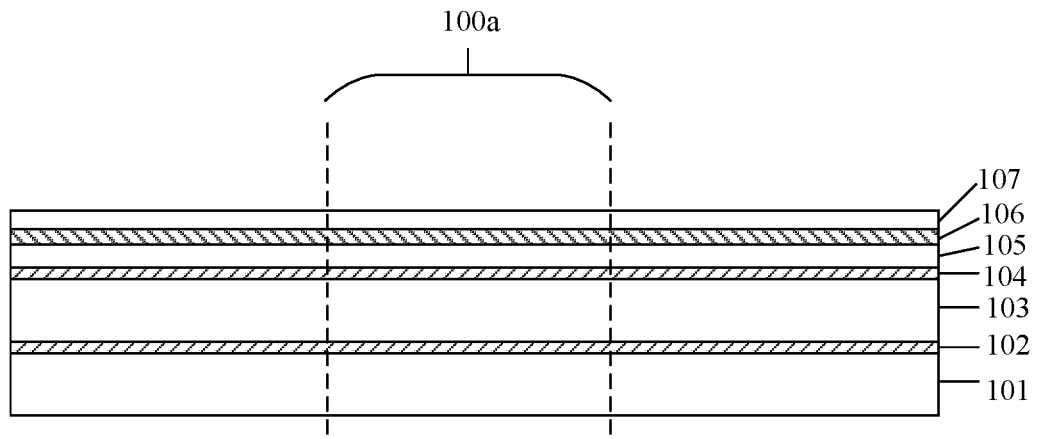
FIG. 1 is a schematic structural diagram of a display substrate according to the prior art.

FIG. 1 is a schematic structural diagram of a display substrate according to an embodiment of the present disclosure. As shown in FIG. 1, after the manufacturing process of a back plate, a first flexible base layer 101, a first barrier layer 102, a second flexible base layer 103, a second barrier layer 104, a buffer layer 105, a gate insulating layer 106, and an interlayer dielectric layer 107 are sequentially formed in an aperture area 100a of the display substrate 100. Generally, because the first barrier layer 102, the second barrier layer 104, the buffer layer 105, the gate insulating layer 106, and the interlayer dielectric layer 107 are made of an inorganic material, the film layers made of the inorganic material (short for inorganic film layers) in the aperture area 100a is relatively thick. Furthermore, inorganic film layers are still formed during formation of other functional layers subsequently, which further increases the thickness of the inorganic film layers. In this case, when the aperture area in which the inorganic film layers with a relatively great thickness is cut by laser to form an aperture, the crack easily occurs, thereby causing poor products.

Figure 2:
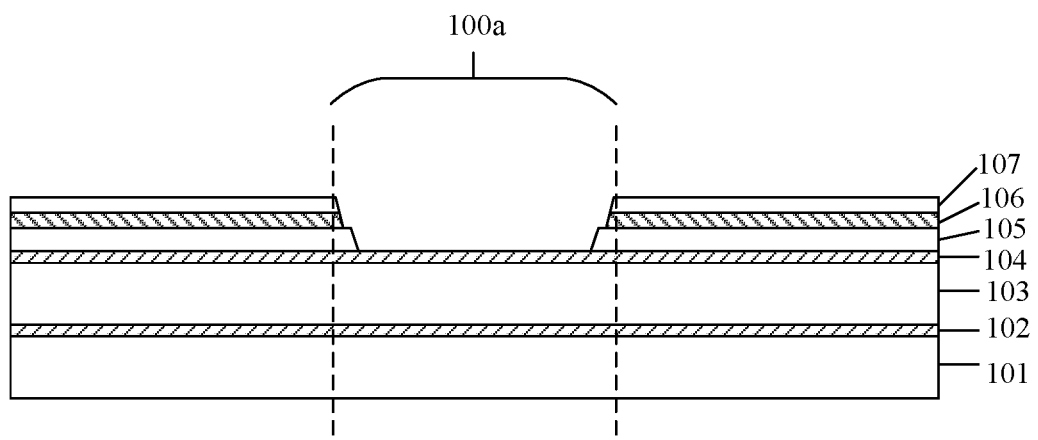
FIG. 2 is a schematic structural diagram of a processed display substrate according to the prior art.

FIG. 2 is a schematic structural diagram of a processed display substrate according to an embodiment of the present disclosure. As shown in FIG. 2, in order to solve the problem of the crack, the thickness of the inorganic film layers, in the aperture area, of the display substrate 100 100a is reduced by patterning (e.g., EBA+EBB process) the inorganic film layers in display area and etching the inorganic film layers, in the aperture area 100a, of the display substrate 100. In this way, the inorganic film layers can be less cut when the aperture area 100a is cut by laser, which solves the problem of the crack to some extent. However, there still are some drawbacks in this manner.

Figure 3:
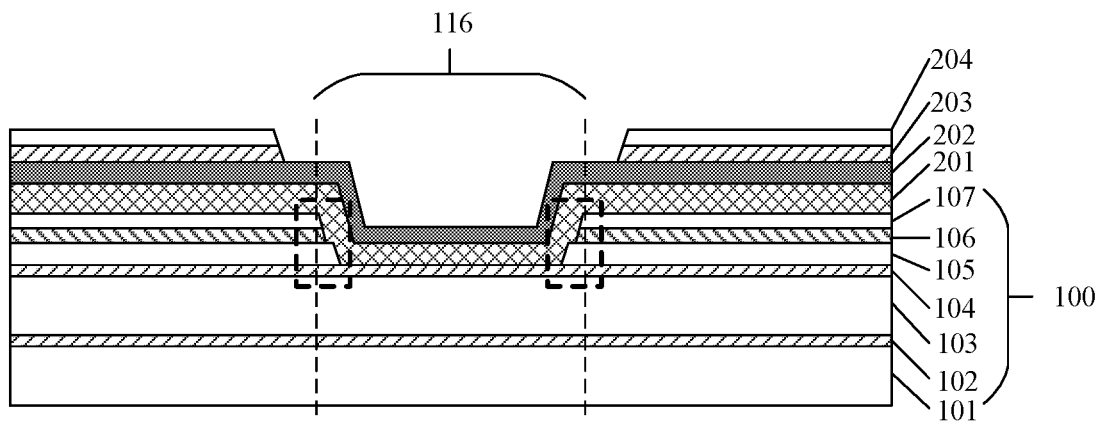
FIG. 3 is a schematic structural diagram of a display substrate formed with other functional layer according to the prior art.

FIG. 3 is a schematic structural diagram of a display substrate formed with other functional layer according to an embodiment of the present disclosure. Here, FIG. 3 may be a schematic diagram of a display device. As shown in FIG. 3, when a display device 01 is manufactured, other functional layers, for example, a first chemical vapor deposition film layer 201, a second chemical vapor deposition film layer 202, a barrier layer 203 and an insulating isolation layer 204 of a touch panel, need to be further formed on the display substrate 100. In addition, the barrier layer 203 and the insulating isolation layer 204 of the touch panel in the display region are further patterned, such that the barrier layer 203 and the insulating isolation layer 204 of the touch panel in the aperture area 100a may be simultaneously etched and removed, and the first chemical vapor deposition film layer 201 and the second chemical vapor deposition film layer 202 are remained.

As can be seen in FIG. 3, before the first chemical vapor deposition film layer 201 and the second chemical vapor deposition film layer 202 are formed, the inorganic film layers of the aperture area 100a is removed and a groove is formed. Therefore, a segment difference on two sides of the aperture area 100a is large (as shown in the dashed box of FIG. 3). Thus, the film forming effect of the first chemical vapor deposition film layer 201 and the second chemical vapor deposition film layer 202 is poor at two sides of the aperture area 100a, which easily results in the problem of film peeling. Additionally, the first chemical vapor deposition film layer 201 and the second chemical vapor deposition film layer 202 are made of inorganic materials, which results in a greater risk of cracking in the laser cutting process.

Figure 4:
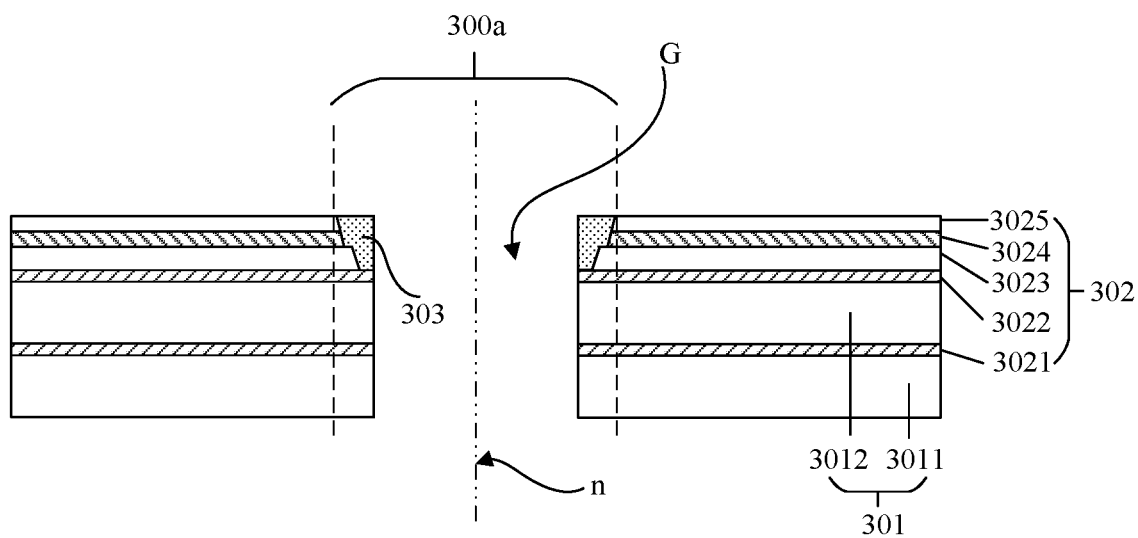
FIG. 4 is a schematic structural diagram of another display substrate according to an embodiment of the present disclosure.

FIG. 4 is a schematic structural diagram of a display substrate according to an embodiment of the present disclosure. As can be seen with reference to FIG. 4, the display substrate 300 may include a plurality of organic material film layers 301 and a plurality of inorganic material film layers 302. For example, two organic material film layers 301 and five inorganic material film layers 302 are shown in FIG. 4.

Here, a functional hole G is provided in the plurality of organic material film layers 301 and the plurality of inorganic material film layers 302, and the functional hole G may be disposed in the aperture area 300a of the display substrate 300. Optionally, the functional hole G may be an aperture for placing a camera, or the functional hole G may be an aperture of a display device to performing other functions.

Figure 5:
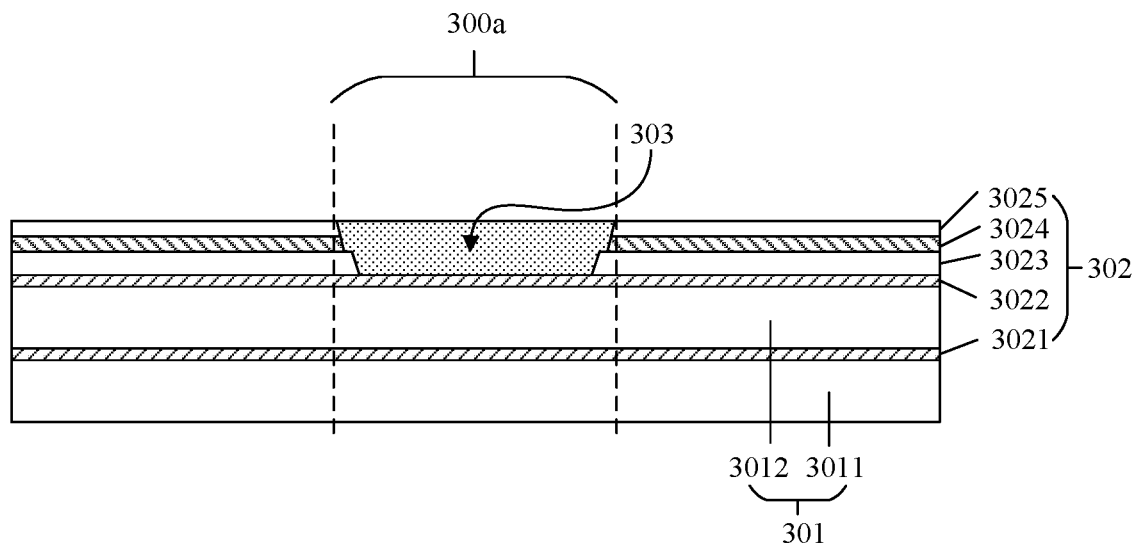
FIG. 5 is a schematic structural diagram of a display substrate before cutting according to an embodiment of the present disclosure.

FIG. 5 is a schematic structural diagram of a display substrate before cutting according to an embodiment of the present disclosure. Referring to FIG. 5, when the display substrate is not cut, at least one of the plurality of inorganic material film layers may be provided with a groove, and the groove is filled with an organic material 303. An orthographic projection of the organic material 303 onto the organic material film layers covers the aperture area 300a of the display substrate. As such, combined with FIG. 4 and FIG. 5, as the organic material 303 is filled in the groove of at least one of the inorganic material film layers, a cutting line may be inside the organic material 303 when the functional hole G in the plurality of organic material film layers 301 and the plurality of inorganic material film layers 302 is formed by cutting. Moreover, the inner side wall of the functional hole in at least one of the plurality of inorganic material film layers is provided with the organic material 303. That is, when the functional hole G in at least one of the inorganic material film layers 302 is formed, the material which is cut is the organic material 303.

In the embodiments of the present disclosure, because the inner side wall of the functional hole G of at least one of the plurality of inorganic material film layers 302 is provided with the organic material 303, the thickness of the inorganic film layer, in the aperture area 300a, of the display substrate 300 is reduced. In this way, the inorganic film layer can be less cut when the aperture area 300a is cut by laser, thereby solving the problem of the crack to some extent.

In summary, a display substrate is provided in the embodiments of the present disclosure. Because the inner side wall of the functional hole in at least one of the plurality of inorganic material film layers in the display substrate is provided with the organic material, the total thickness of the inorganic film layers in the aperture area with the functional hole is smaller. Therefore, when the plurality of organic material film layers and the plurality of inorganic material film layers are cut to form the functional hole, the thickness of the inorganic film layers to be cut can be reduced, thereby solving the cracking problem to some extent.

As can be seen with reference to FIG. 4, the plurality of organic material film layers 301 include a first organic material layer 3011 and a second organic material layer 3012. The plurality of inorganic material film layers 302 include a first inorganic material layer 3021, a second inorganic material layer 3022, a third inorganic material layer 3023, a fourth inorganic material layer 3024, and a fifth inorganic material layer 3025. Here, the first organic material layer 3011, the first inorganic material layer 3021, the second organic material layer 3012, the second inorganic material layer 3022, the third inorganic material layer 3023, the fourth inorganic material layer 3024, and the fifth inorganic material layer 3025 are sequentially laminated.

Here, the inner side wall of the functional hole in at least one of the third inorganic material layer 3023, the fourth inorganic material layer 3024, and the fifth inorganic material layer 3025 is provided with the organic material.

Optionally, the organic material 303 may cover an end face, facing the functional hole G, of at least one of the third inorganic material layer 3023, the fourth inorganic material layer 3024 and the fifth inorganic material layer 3025, which can prevent the crack problem resulted from the third inorganic material layer 3023, the fourth inorganic material layer 3024, or the fifth inorganic material layer 3025 being on the cutting line of the functional hole G.

For example, with reference to FIG. 4, the organic material 303 covers the end face, facing the functional hole G, each of the third inorganic material layer 3023, the fourth inorganic material layer 3024 and the fifth inorganic material layer 3025. Moreover, referring to FIG. 4, an orthographic projection of the organic material 303 onto the first organic material layer 3011 covers a target area of the first organic material layer 3011, and the target area is a portion, disposed in the aperture area 300a, of the first organic material layer 3011. Thus, when the functional hole G is formed in the cutting process, the cutting line may be positioned inside the organic material 303, and the organic material 303 is cut, so as to reduce the crack.

Here, the orthographic projection of the organic material 303 onto the first organic material layer 3011 covering the target area of the first organic material layer 3011 may refer to that the organic material 303 covers an end face, proximal to the first inorganic material layer 3021, of the first organic material layer 3011 disposed in the aperture area 300a.

Referring to FIG. 4, an inner side wall of the functional hole in the first organic material layer 3011, the first inorganic material layer 3021, the second organic material layer 3012 and the second inorganic material layer 3022 is flush with an inner side wall, on which the organic material 303 is provided, of the functional hole in the third inorganic material layer 3023, the fourth inorganic material layer 3024 and the fifth inorganic material layer 3025.

For example, the inner side wall of the functional hole in the first organic material layer 3011, the first inorganic material layer 3021, the second organic material layer 3012 and the second inorganic material layer 3022, and the inner side wall, on which the organic material 303 is provided, of the functional hole in the third inorganic material layer 3023, the fourth inorganic material layer 3024 and the fifth inorganic material layer 3025 may be formed by the same cutting process. Moreover, the inner side wall of the functional hole G in each of the third inorganic material layer 3023, the fourth inorganic material layer 3024 and the fifth inorganic material layer 3025 is provided with the organic material 303. That is, the organic material 303, rather than the inorganic material in the third inorganic material layer 3023, the fourth inorganic material layer 3024, and the fifth inorganic material layer 3025, is cut.

Additionally, after the organic material 303 is provided in the inner side wall of the functional hole G in the third inorganic material layer 3023, the fourth inorganic material layer 3024, and the fifth inorganic material layer 3025, the surface of the organic material 303 distal from the first organic material layer 3011 is flush with the surface of the fifth inorganic material layer 3025 distal from the first organic material layer 3011, so that the planarity of the aperture area 300a can be ensured. Thus, a larger segment difference will not occur in the aperture area during formation of other functional layers subsequently, and the problem of film layer peeling is avoided.

Optionally, the third inorganic material layer 3023 may be a buffer layer, the fourth inorganic material layer 3024 may be an insulating layer, and the fifth inorganic material layer 3025 may be an interlayer dielectric layer.

Optionally, the first organic material layer 3011 and the second organic material layer 3012 may be a flexible base layer of the display substrate 300. Materials of the first organic material layer 3011 and the second organic material layer 3012 may be polyimide (PI). Further, the organic material 303 provided in the inner side wall of the functional hole G may also be polyimide. In some optional embodiments, the thicknesses of the first organic material layer 3011 and the second organic material layer 3012 may range from 5 μm to 10 μm (for example, may be 8 μm).

Optionally, the first inorganic material layer 3021 and the second inorganic material layer 3022 may be barrier layers of the display substrate 300, which are mainly configured to block diffusion of water and oxygen. The materials of the first inorganic material layer 3021 and the second inorganic material layer 3022 may be silicon oxide ($SiO_x$) or silicon nitride ($SiN_x$). In some optional embodiments, the thicknesses of the first inorganic material layer 3021 and the second inorganic material layer 3022 may range from 2000 angstroms (Å) to 5000 Å (for example, may be 3000 Å).

Figure 6:
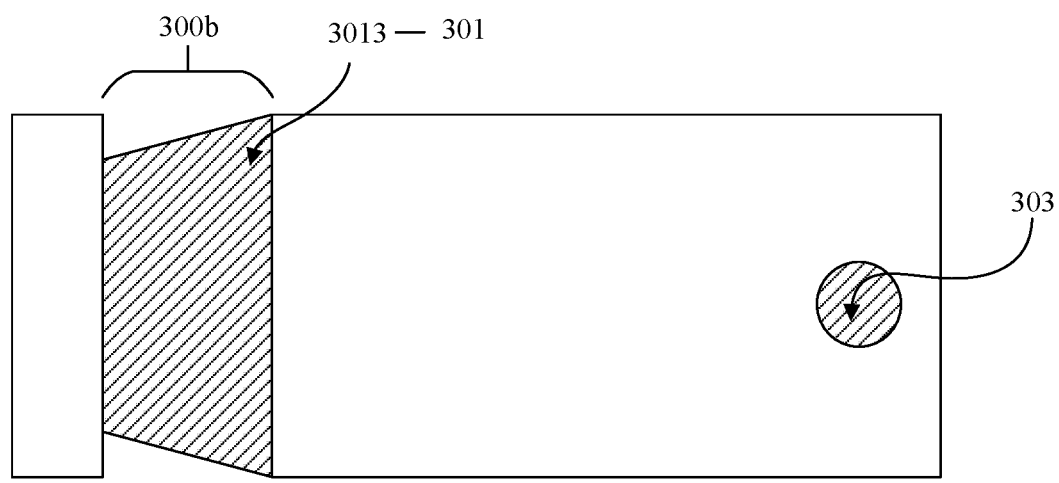
FIG. 6 is a top view of a display substrate according to an embodiment of the present disclosure.

In some embodiments, the display substrate (for example, the display substrate 300 shown in FIG. 6) may further include a pad bending area 300b. Referring to FIG. 6, the plurality of organic material film layers 301 may include a third organic material layer 3013, which may be disposed in the pad bending area 300b of the display substrate.

Optionally, the third organic material layer 3013 and the organic material 303 may be formed by a same patterning process. For example, the third organic material layer 3013 and the organic material 303 may be made of the same material in the same layer, thereby reducing the manufacturing processes and increasing production efficiency.

In the embodiments of the present disclosure, a corresponding aperture may be formed at a position, corresponding to the aperture area 300a, on a mask configured to form the third organic material layer 3013 disposed in the pad bending area 300b, and then the third organic material layer 3013 in the pad bending area 300b and the organic material 303 disposed on the side wall of the functional hole G may be prepared simultaneously in the same process by using the same mask.

Referring to FIG. 4, along an axial direction n of the functional hole G, the sum of thicknesses of the first inorganic material layer 3021 and the second inorganic material layer 3022 is less than 5% of the sum of thicknesses of the first organic material layer 3011, the first inorganic material layer 3021, the second organic material layer 3012, the second inorganic material layer 3022, the third inorganic material layer 3023, the fourth inorganic material layer 3024, and the fifth inorganic material layer 3025. In this case, when the aperture area 300a is cut, the thickness of the inorganic material film layers is much less than the thickness of the organic material film layers along the cutting line, which can reduce the possibility of generating the crack.

Referring to FIG. 4, it should be noted that if the organic material 303 is disposed on the side wall of the functional hole G in the third inorganic material layer 3023, the fourth inorganic material layer 3024 and the fifth inorganic material layer 3025, the inner side wall of the functional hole G are the first organic material layer 3011, the first inorganic material layer 3021, the second organic material layer 3012, the second inorganic material layer 3022, and the organic material 303 in sequence. That is, if the functional hole G is cylindrical with an axis n, the first organic material layer 3011, the first inorganic material layer 3021, the second organic material layer 3012, the second inorganic material layer 3022, and the organic material 303 may be disposed along the axial direction n.

Further, if the surface of the organic material 303 distal from the first organic material layer 3011 is flush with the surface of the fifth inorganic material layer 3025 distal from the first organic material layer 3011, the thickness of the organic material 303 may be the same as the total thickness of the third inorganic material layer 3023, the fourth inorganic material layer 3024, and the fifth inorganic material layer 3025. Thus, the sum of the thicknesses of the first inorganic material layer 3021 and the second inorganic material layer 3022 being less than 5% of the sum of the thicknesses of the first organic material layer 3011, the first inorganic material layer 3021, the second organic material layer 3012, the second inorganic material layer 3022, the third inorganic material layer 3023, the fourth inorganic material layer 3024, and the fifth inorganic material layer 3025 may refer to that the sum of the thicknesses of the first inorganic material layer 3021 and the second inorganic material layer 3022 is less than 5% of the sum of the thicknesses of the first organic material layer 3011, the first inorganic material layer 3021, the second organic material layer 3012, the second inorganic material layer 3022, and the organic material 303.

Optionally, along the axial direction n of the functional hole G, the sum of thicknesses of the first inorganic material layer 3021 and the second inorganic material layer 3022 is less than 1% of the sum of thicknesses of the first organic material layer 3011, the first inorganic material layer 3021, the second organic material layer 3012, the second inorganic material layer 3022, the third inorganic material layer 3023, the fourth inorganic material layer 3024, and the fifth inorganic material layer 3025, thereby further reducing the possibility of generating the crack.

Optionally, the thickness of the first organic material layer 3011 ranges from 5 μm to 10 μm. The thickness of the first inorganic material layer 3021 ranges from 2000 Å to 5000 Å. The thickness of the second inorganic material layer 3022 ranges from 2000 Å to 5000 Å. The thickness of the second organic material layer 3012 ranges from 5 μm to 10 μm. The sum of the thicknesses of the third inorganic material layer 3023, the fourth inorganic material layer 3024, and the fifth inorganic material layer 3025 (i.e., the thickness of the organic material 303) ranges from 0.5 μm to 2 μm.

In summary, the embodiments of the present disclosure provide a display substrate. Because the inner side wall of the functional hole in at least one of the plurality of inorganic material film layers in the display substrate is provided with an organic material, the total thickness of the inorganic film layers of the display substrate is smaller in the aperture area provided with the functional hole. Therefore, when the plurality of organic material film layers and the plurality of inorganic material film layers are cut to form the functional hole, the thickness of the inorganic film layers to be cut can be reduced, thereby solving the cracking problem to some extent.

FIG. 7 is a schematic structural diagram of a display device according to an embodiment of the present disclosure. As can be seen with reference to FIG. 7, the display device 02 may include a display substrate and a power supply assembly (not shown in the figure), and the power supply assembly may be connected to the display substrate and configured to supply power to the display substrate. The display substrate in the display device 02 may be the display substrate 300 provided in the embodiments described above.

Optionally, the display device may further include a touch panel. The touch panel may include a barrier layer 403 and an insulating isolation layer 404 sequentially laminated along a direction going away from the display substrate.

Here, an orthographic projection of the barrier layer 403 onto the display substrate 300 and an orthographic projection of the insulating isolation layer 404 onto the display substrate 300 do not overlap with the aperture area 300a of the display substrate 300. For example, in the manufacturing process of the touch panel, the barrier layer 403 and the insulating isolation layer 404 may be patterned to remove materials at the position, corresponding to the aperture area 300a of the display substrate 300, in the barrier layer 403 and the insulating isolation layer 404, to prevent the barrier layer 403 and the insulating isolation layer 404 of the touch panel from being cut when the functional hole G is formed, thereby preventing the crack from generating.

Further, referring to FIG. 7, the display device 02 may further include a first chemical vapor deposition film layer 401 and a second chemical vapor deposition film layer 402 disposed between the display substrate 300 and the touch panel. Optionally, both of the first chemical vapor deposition film layer 401 and the second chemical vapor deposition film layer 402 may be made of inorganic materials.

Optionally, an orthographic projection of the first chemical vapor deposition film layer 401 onto the display substrate 300 and an orthographic projection of the second chemical vapor deposition layer 402 onto the display substrate 300 do not overlap with the aperture area 300a of the display substrate 300. For example, the materials at the position, corresponding to the aperture area 300a, in the first chemical vapor deposition film layer 401 and the second chemical vapor deposition film layer 402 may be removed by an etching process.

Because the inner side wall of the functional hole G of at least one inorganic material film layer 302 of the display substrate 300 is provided with an organic material 303, the thickness of the inorganic film layers of the display substrate 300 in the aperture area 300a is reduced. In addition, the orthographic projection of the first chemical vapor deposition film layer 401 onto the display substrate 300 and the orthographic projection of the second chemical vapor deposition layer 402 onto the display substrate 300 do not overlap with the aperture area 300a of the display substrate 300, such that almost no inorganic film layer is disposed on the cutting line of the functional hole G when the functional hole G of the display substrate 300 is formed by cutting subsequently, which reduces the risk of cracking in the laser cutting process and effectively reduces the incidence of the GDS in reliability test.

It should be noted that the display device in the embodiments of the present disclosure may be any product or component having a display function such as an electronic paper, a cell phone, a tablet computer, a television, a laptop computer, a digital photo frame, a navigator, or the like.

In summary, the embodiments of the present disclosure provide a display device. Because the inner side wall of the functional hole in at least one of the plurality of inorganic material film layers in the display substrate of the display device is provided with an organic material, the total thickness of the inorganic film layers of the display substrate is smaller in the aperture area provided with the functional hole. Therefore, when the plurality of organic material film layers and the plurality of inorganic material film layers are cut to form the functional hole, the thickness of the inorganic film layer to be cut can be reduced, thereby solving the cracking problem to some extent.

FIG. 8 is a flowchart showing a method of manufacturing a display device according to an embodiment of the present disclosure. The method may be applicable to manufacture the display device provided in the embodiments described above. Referring to FIG. 8, the method may include the following steps.

In step 501, a first organic material layer, a first inorganic material layer, a second organic material layer, a second inorganic material layer, a third inorganic material layer, a fourth inorganic material layer, and a fifth inorganic material layer are formed in sequence.

Figure 9:
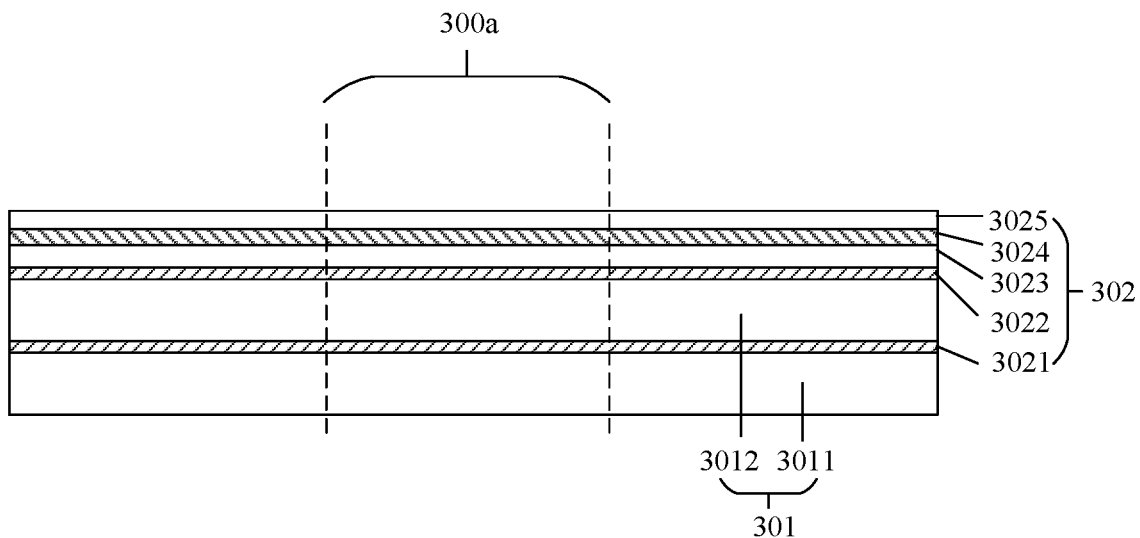
FIG. 9 is a schematic diagram of a plurality of organic material layers and a plurality of inorganic material layers according to an embodiment of the present disclosure.

In the embodiments of the present disclosure, when the display device 02 is manufactured, a plurality of organic material film layers 301 and a plurality of inorganic material film layers 302 in a display substrate 300 may be formed first. For example, referring to FIG. 9, the first organic material layer 3011, the first inorganic material layer 3021, the second organic material layer 3012, the second inorganic material layer 3022, the third inorganic material layer 3023, the fourth inorganic material layer 3024, and the fifth inorganic material layer 3025 may be sequentially formed. That is, the first organic material layer 3011, the first inorganic material layer 3021, the second organic material layer 3012, the second inorganic material layer 3022, the third inorganic material layer 3023, the fourth inorganic material layer 3024, and the fifth inorganic material layer 3025 are sequentially laminated.

In step 502, portions, disposed in an aperture area, of the third inorganic material layer, the fourth inorganic material layer, and the fifth inorganic material layer are removed to form a groove.

Figure 10:
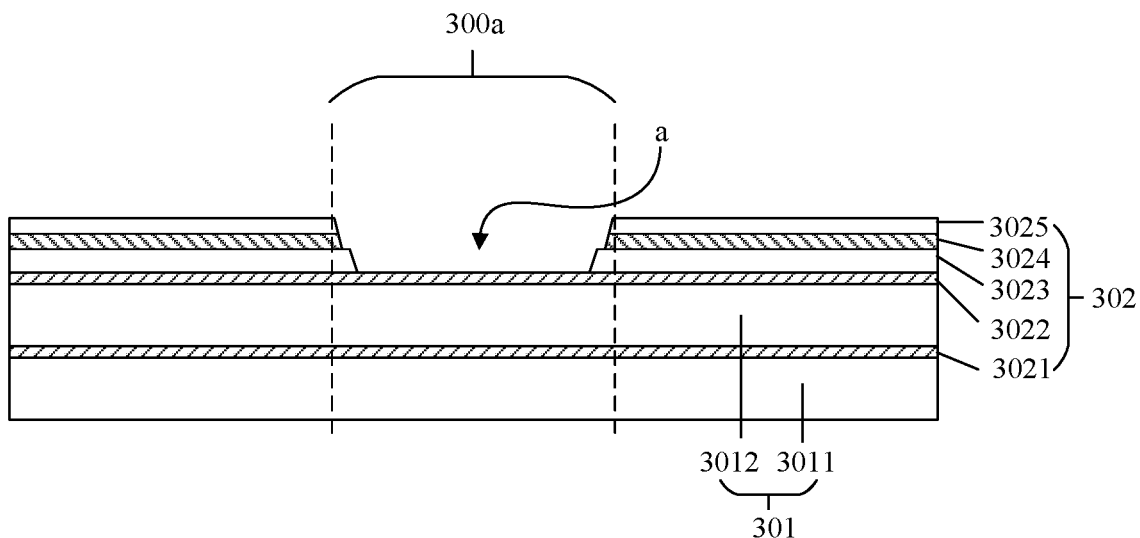
FIG. 10 is a schematic diagram of a formed groove according to an embodiment of the present disclosure.

In the embodiments of the present disclosure, the display substrate 300 may be provided with the aperture area 300a. Further, referring to FIG. 10, the portions, disposed in the aperture area 300a, of the third inorganic material layer 3023, the fourth inorganic material layer 3024, and the fifth inorganic material layer 3025 may be removed by the etching process to form the groove a. The formed groove a may be disposed in the aperture area 300a.

In step 503, the groove is filled with an organic material.

In the embodiments of the present disclosure, referring to FIG. 5, after the groove a is filled with the organic material 303, the surface of the organic material 303 distal from the first organic material layer 3011 is flush with the surface of the fifth organic material layer 3025 distal from the first organic material layer 3011, so that the planarity of the aperture area 300a may be ensured. Thus, a larger segment difference will not occur in the aperture area during formation of other functional layers subsequently, and the problem of film layer peeling is avoided.

Optionally, the organic material 303 may be polyimide. In some optional embodiments, the thickness of the organic material 303 may range from 0.5 µm to 2 µm (for example, may be 1 µm).

In some embodiments, as shown in FIG. 6, the plurality of organic material film layers 301 of the display substrate 300 further include a third organic material layer 3013, and the third organic material layer 3013 may be disposed in a pad bending area 300b of the display substrate.

Optionally, the third organic material layer 3013 and the organic material 303 filling the groove a may be formed by the same patterning process. That is, the third organic material layer 3013 and the organic material 303 may be made of the same material in the same layer, thereby reducing the manufacturing process.

In step 504, a first chemical vapor deposition film layer, a second chemical vapor deposition film layer, and a barrier layer and an insulating isolation layer of a touch panel are formed in sequence.

Figure 11:
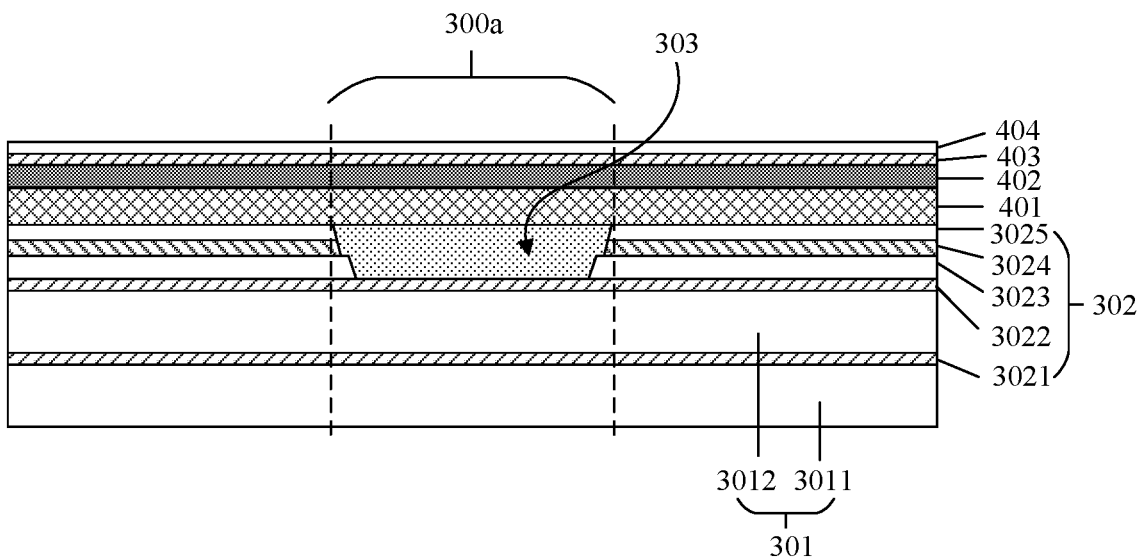
FIG. 11 is a schematic diagram of a first chemical vapor deposition film layer, a second chemical vapor deposition film layer, a barrier layer, and an insulating isolation layer according to an embodiment of the present disclosure.

In the embodiments of the present disclosure, after the groove a is filled with the organic material 303, referring to FIG. 11, the first chemical vapor deposition film layer 401 and the second chemical vapor deposition film layer 402 may be sequentially formed on a side of the fifth inorganic material layer 3025 distal from the fourth inorganic material layer 3024. Further, the barrier layer 403 and the insulating isolation layer 404 of the touch panel may be formed on the second chemical vapor deposition film layer 402.

In step 505, the barrier layer and the insulating isolation layer are patterned.

Figure 12:
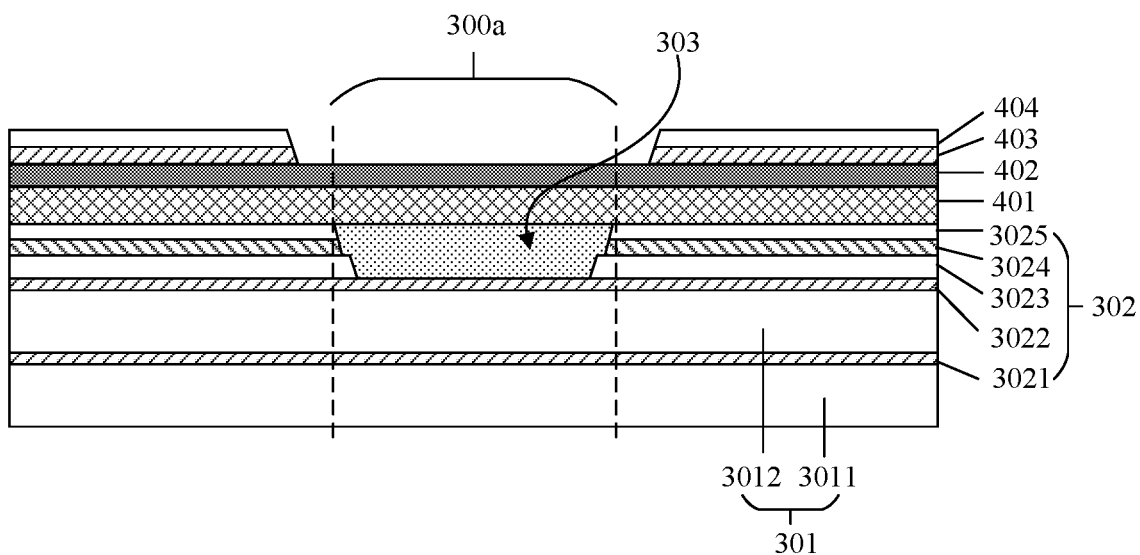
FIG. 12 is a schematic diagram of patterning a barrier layer and an insulating isolation layer according to an embodiment of the present disclosure.

In the embodiments of the present disclosure, referring to FIG. 12, the barrier layer 403 and the insulating isolation layer 404 may be patterned in the manufacturing process of the touch panel, and in the patterning step, the portions, in the aperture area 300a, of the barrier layer 403 and the insulating isolation layer 404 may be etched, to remove the portions, in the aperture area 300a, of the barrier layer 403 and the insulating isolation layer 404, to prevent the barrier layer 403 and the insulating isolation layer 404 from being cut when the functional hole is formed subsequently, thereby preventing the crack from generating.

In step 506, portions, disposed in the aperture area, of the first chemical vapor deposition film layer and the second chemical vapor deposition film layer are removed.

Figure 13:
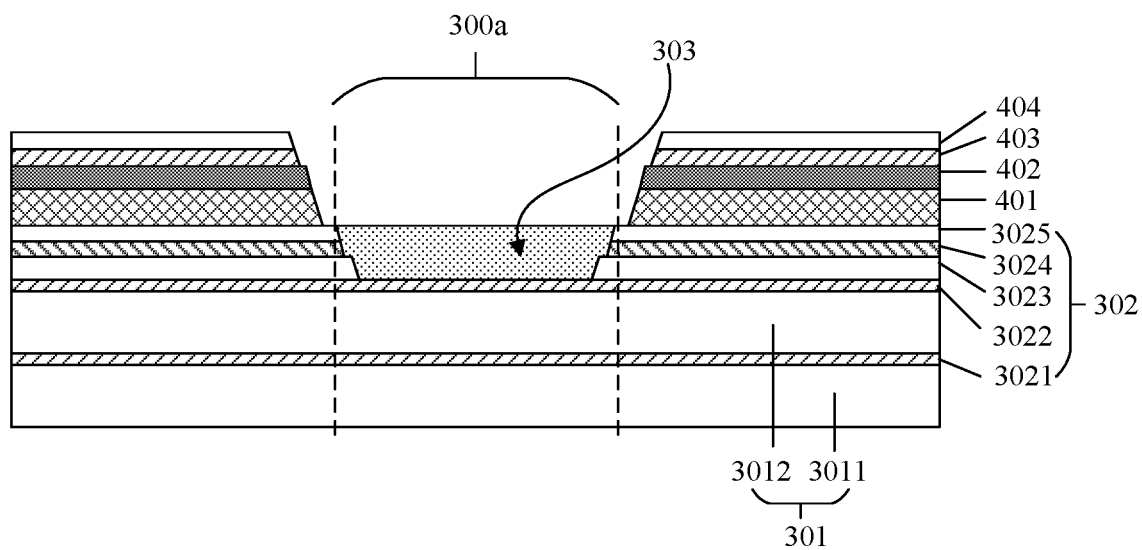
FIG. 13 is a schematic diagram of removing portions, disposed in an aperture area, of a first chemical vapor deposition film layer and a second chemical vapor deposition film layer according to an embodiment of the present disclosure.

In the embodiments of the present disclosure, referring to FIG. 13, after the portions, in in the aperture area 300a, of the barrier layer 403 and the insulating isolation layer 404 are removed, the portions, disposed in the aperture area 300a, of the first chemical vapor deposition film layer 401 and the second chemical vapor deposition film layer 402 may be further removed, to expose the organic material 303 filled in the groove a.

In some embodiments, the etching process may be adopted to remove the portions, disposed in the aperture area 300a, of the first chemical vapor deposition film layer 401 and the second chemical vapor deposition film layer 402, and the etching process may be completed by using a mask provided with an aperture at a corresponding position of the aperture area 300a.

In step 507, a functional hole is formed in the aperture area.

In the embodiments of the present disclosure, after the organic material 303 filled in the groove a is exposed, the functional hole G may be further formed in the aperture area 300a, to obtain a display device (e.g., the display device 02 shown in FIG. 7). Optionally, the functional hole G may be an aperture for placing a camera, or the functional hole G may be an aperture for performing other functions for the display device.

In some embodiments, forming the functional hole G in the aperture area 300a may further include cutting the organic material 303 filled in the groove a, the second inorganic material layer 3022, the second organic material layer 3012, the first inorganic material layer 3021, and the first organic material layer 3011 to form the functional hole G. As shown in FIG. 7, the cutting line of the functional hole G is in the organic material 303 filled in the groove a so that the inner side wall of the formed functional hole G is provided with the organic material 303.

As can be seen, in the method of manufacturing the display device provided in the embodiments of the present disclosure, by filling the organic material 303 at the cutting location of the functional hole G and removing the portions, at the cutting location, of the first chemical vapor deposition film layer 401 and the second chemical vapor deposition film layer 402, almost no inorganic film layer is disposed on the cutting line of the functional hole G, which reduces the risk of cracking in the laser cutting process and effectively reduces the incidence of GDS in the incidence test.

Optionally, referring to FIG. 7, in the display device 02, the organic material 303 covers the end face, facing the functional hole, of each of the third inorganic material layer 3023, the fourth inorganic material layer 3024 and the fifth inorganic material layer 3025. Further, the orthographic projection of the organic material 303 onto the first organic material layer 3011 covers the target area of the first organic material layer 3011, and the target area is a portion, in the aperture area 300a, of the first organic material layer 3011. Thus, when the functional hole G is formed in the cutting process, the cutting line may be positioned inside the organic material 303, and the organic material 303 is cut, so that the crack can be reduced.

In summary, the embodiments of the present disclosure provide a method of manufacturing a display device. The organic material is filled in the groove formed after etching the inorganic film layer in the aperture area, so that almost no inorganic film layer is disposed on the cutting line when the functional hole G is formed by laser cutting in the aperture area, thereby reducing the risk of cracking in the laser cutting process and effectively reducing the incidence of the GDS.

It should be noted that in the accompanying drawings, for clarity of illustration, the dimension of the layers and regions may be scaled up. It should be understood that when an element or layer is described as being "on" another element or layer, the described element or layer may be directly located on the another element or layer, or an intermediate layer may exist. In addition, it should be understood that when an element or layer is described as being "under" another element or layer, the described element or layer may be directly located under the another element, or more than one intermediate layer or element may exist. In addition, it should be further understood that when a layer or element is described as being "between" two layers or elements, the described layer or element may be the only layer between the two layers or elements, or more than one intermediate layer or element may exist. In the whole disclosure, like reference numerals indicate like elements.

It should be understood by those of ordinary skill in the art that the descriptions above are merely exemplary embodiments of the present disclosure, and are not intended to limit the present disclosure. Any modifications, equivalent replacements, improvements and the like made within the spirit and principles of the present disclosure should shall within the scope of protection of the present disclosure.

What is claimed is:

1. A display substrate, comprising:
a plurality of organic material film layers and a plurality of inorganic material film layers, wherein the plurality of organic material film layers and the plurality of inorganic material film layers are provided with a functional hole, and the functional hole is disposed in an aperture area of the display substrate;
wherein an inner side wall of the functional hole in at least one of the inorganic material film layers is provided with an organic material;
the plurality of organic material film layers comprise a first organic material layer and a second organic material layer, and the plurality of inorganic material film layers comprise a first inorganic material layer, a second inorganic material layer, a third inorganic material layer, a fourth inorganic material layer and a fifth inorganic material layer, wherein
the first organic material layer, the first inorganic material layer, the second organic material layer, the second inorganic material layer, the third inorganic material layer, the fourth inorganic material layer and the fifth inorganic material layer are sequentially laminated; and
the inner side wall of the functional hole in at least one of the third inorganic material layer, the fourth inorganic material layer, and the fifth inorganic material layer is provided with the organic material.

2. The display substrate according to claim 1, wherein the organic material covers an end face, facing the functional hole, of at least one of the third inorganic material layer, the fourth inorganic material layer and the fifth inorganic material layer.

3. The display substrate according to claim 2, wherein the organic material covers the end face, facing the functional hole, of each of the third inorganic material layer, the fourth inorganic material layer and the fifth inorganic material layer.

4. The display substrate according to claim 1, wherein the inner side wall of the functional hole in the first organic material layer, the first inorganic material layer, the second organic material layer and the second inorganic material layer is flush with the inner side wall, on which the organic material is provided, of the functional hole in the third inorganic material layer, the fourth inorganic material layer and the fifth inorganic material layer.

5. The display substrate according to claim 1, wherein an orthographic projection of the organic material onto the first organic material layer covers a target area of the first organic material layer; and
the target area is a portion, disposed in the aperture area, of the first organic material layer.

6. The display substrate according to claim 1, wherein the third inorganic material layer is a buffer layer, the fourth inorganic material layer is an insulating layer, and the fifth inorganic material layer is an interlayer dielectric layer.

7. The display substrate according to claim 1, wherein the organic material is polyimide.

8. The display substrate according to claim 1, wherein the plurality of organic material film layers further comprise a third organic material layer, and the third organic material layer is disposed in a pad bending area of the display substrate.

9. The display substrate according to claim 8, wherein the third organic material layer and the organic material are formed by a same patterning process.

10. The display substrate according to claim 9, wherein the third organic material layer and the organic material are made of a same material in a same layer.

11. The display substrate according to claim 1, wherein a sum of thicknesses of the first inorganic material layer and the second inorganic material layer is less than 5% of a sum of thicknesses of the first organic material layer, the first inorganic material layer, the second organic material layer, the second inorganic material layer, the third inorganic material layer, the fourth inorganic material layer, and the fifth inorganic material layer.

12. The display substrate according to claim 11, wherein the sum of the thicknesses of the first inorganic material layer and the second inorganic material layer is less than 1% of the sum of the thicknesses of the first organic material layer, the first inorganic material layer, the second organic material layer, the second inorganic material layer, the third inorganic material layer, the fourth inorganic material layer, and the fifth inorganic material layer.

13. The display substrate according to claim 11, wherein the thickness of the first organic material layer ranges from 5 μm to 10 μm, the thickness of the first inorganic material layer ranges from 2000 Å to 5000 Å, the thickness of the second inorganic material layer ranges from 2000 Å to 5000 Å, the thickness of the second organic material layer ranges from 5 μm to 10 μm, and a sum of the thicknesses of the third inorganic material layer, the fourth inorganic material layer, and the fifth inorganic material layer ranges from 0.5 μm to 2 μm.

14. A display device, comprising a display substrate and a power supply assembly, wherein the power supply assembly is configured to supply power to the display substrate; and the display substrate comprises:
- a plurality of organic material film layers and a plurality of inorganic material film layers, wherein the plurality of organic material film layers and the plurality of inorganic material film layers are provided with a functional hole, and the functional hole is disposed in an aperture area of the display substrate;
- wherein an inner side wall of the functional hole in at least one of the inorganic material film layers is provided with an organic material;
- the plurality of organic material film layers comprise a first organic material layer and a second organic material layer, and the plurality of inorganic material film layers comprise a first inorganic material layer, a second inorganic material layer, a third inorganic material layer, a fourth inorganic material layer and a fifth inorganic material layer, wherein
- the first organic material layer, the first inorganic material layer, the second organic material layer, the second inorganic material layer, the third inorganic material layer, the fourth inorganic material layer and the fifth inorganic material layer are sequentially laminated; and
- the inner side wall of the functional hole in at least one of the third inorganic material layer, the fourth inorganic material layer, and the fifth inorganic material layer is provided with the organic material.

15. The display device according to claim 14, further comprising a touch panel, wherein
the touch panel comprises a barrier layer and an insulating isolation layer sequentially laminated along a direction going away from the display substrate.

16. The display device according to claim 15, further comprising a first chemical vapor deposition film layer and a second chemical vapor deposition film layer disposed between the display substrate and the touch panel.

17. A method of manufacturing a display device, comprising:
- forming a plurality of organic material film layers and a plurality of inorganic material film layers of a display substrate;
- forming a groove in at least one of the inorganic material film layers, wherein the groove is disposed in an aperture area of the display substrate;
- filling the groove with an organic material;
- forming a touch panel on a side of the display substrate; and
- forming a functional hole in the aperture area, wherein a cutting line of the functional hole is inside the organic material so that an inner side wall of the functional hole is provided with the organic material;
wherein
forming the plurality of organic material film layers and the plurality of inorganic material film layers of the display substrate comprises:
- forming a first organic material layer, a first inorganic material layer, a second organic material layer, a second inorganic material layer, a third inorganic material layer, a fourth inorganic material layer, and a fifth inorganic material layer in sequence; and
forming the groove in at least one of the inorganic material film layers comprises:
- removing portions, disposed in the aperture area, of the third inorganic material layer, the fourth inorganic material layer and the fifth inorganic material layer, to form the groove;
wherein after filling the groove with the organic material, a surface of the organic material distal from the first organic material layer is flush with a surface of the fifth inorganic material layer distal from the first organic material layer.

18. The method according to claim 17, wherein the plurality of organic material film layers comprise a third organic material layer, and the third organic material layer is disposed in a pad bending area of the display substrate; and
filling the groove with the organic material comprises:
- forming the third organic material layer and the organic material filling the groove by a same patterning process.

* * * * *